United States Patent
Hayton (10) Patent No.: US 9,237,009 B2
(45) Date of Patent: *Jan. 12, 2016

(54) DISRUPTING OFFLINE PASSWORD ATTACKS

(71) Applicant: Citrix Systems, Inc., Fort Lauderdale, FL (US)

(72) Inventor: Richard Hayton, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/561,856

(22) Filed: Dec. 5, 2014

(65) Prior Publication Data

US 2015/0163055 A1    Jun. 11, 2015

Related U.S. Application Data (63) Continuation of application No. 13/886,905, filed on May 3, 2013, now Pat. No. 8,949,617.

(51) Int. Cl.
*H04L 9/30* (2006.01)
*H04L 9/08* (2006.01)
*G06F 21/62* (2013.01)
(Continued)

(52) U.S. Cl.
CPC .............. *H04L 9/0838* (2013.01); *G06F 21/46* (2013.01); *G06F 21/6209* (2013.01); *H04L 9/0861* (2013.01); *H04L 9/0863* (2013.01); *H04L 9/0894* (2013.01); *G06F 2221/2107* (2013.01); *H04L 9/0822* (2013.01); *H04L 9/3226* (2013.01); *H04L 2209/24* (2013.01); *H04L 2209/34* (2013.01)

(58) Field of Classification Search
CPC ... H04L 9/0822; H04L 9/0861; H04L 9/3226; H04L 9/0631; G06F 21/6209; G06F 21/46
USPC .............................................. 713/193; 380/44
See application file for complete search history.

(56) References Cited

U.S. PATENT DOCUMENTS

| | | | |
|---|---|---|---|
| 5,479,512 A | 12/1995 | Weiss | |
| 6,154,542 A | 11/2000 | Crandall | |
| 8,238,552 B2 * | 8/2012 | Weber | 380/44 |

(Continued)

FOREIGN PATENT DOCUMENTS

WO    0177991 A2    10/2001

OTHER PUBLICATIONS

Sep. 12, 2014—(US) Notice of Allowance—U.S. Appl. No. 13/886,905.

(Continued)

*Primary Examiner* — Samson Lemma
(74) *Attorney, Agent, or Firm* — Banner & Witcoff, Ltd.

(57) ABSTRACT

Methods and systems for disrupting password attacks using compression are described. A user password may be stored on a mobile computing device. The password may be compressed, for example, using a Huffman compression algorithm, and may be subsequently encrypted using a short secret as a key. The user password may be stored as the compressed and encrypted key. The compressed and encrypted password may be stored such that a brute force password attack, for example, using every possible short secret, would reveal too may possible matches to allow an attacker to select the real password.

20 Claims, 7 Drawing Sheets

(51) Int. Cl.
*G06F 21/46* (2013.01)
*H04L 9/32* (2006.01)

(56) References Cited

U.S. PATENT DOCUMENTS 8,296,852 B2 * 10/2012 Friedrich .................. 726/27

2008/0012690 A1 * 1/2008 Friedrich .................. 340/10.1
2010/0208888 A1 * 8/2010 Weber ........................ 380/44
2011/0055585 A1   3/2011 Lee

OTHER PUBLICATIONS

Oct. 15, 2014—(WO) International Search Report—App. PCT/US2014/035795.

* cited by examiner

DISRUPTING OFFLINE PASSWORD ATTACKS

CROSS-REFERENCE TO RELATED APPLICATIONS

This application is a continuation of and claims priority to U.S. patent application Ser. No. 13/886,905, filed May 3, 2013, and entitled "Disrupting Password Attack Using Compression," which is incorporated herein by reference.

BACKGROUND

It is often useful to store a password or other secret on a device, such as s smartphone or tablet, in order to allow the device to easily connect to services in the cloud or in the enterprise. However, storing the password is a risk, because if the device is stolen the password might be maliciously recovered. This risk is often mitigated by protecting the password and storing it as an encrypted bit string using a short secret as key to the encryption.

However, if the device is lost, an attacker may be able to guess the password based on a brute force attack, such as using every possible shorter secret to decrypt the password and determining which of these decrypted passwords looks like a password. Accordingly, there is a need to store passwords offline in a more secure way.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Methods and systems for disrupting password attacks using compression are described. A user password may be stored on a mobile computing device. The password may be compressed, for example, using a Huffman compression algorithm, and may be subsequently encrypted using a secret as a key. The user password may be stored as the compressed and encrypted key. The compressed and encrypted password may be stored such that a brute force password attack, for example, using every possible short secret, would reveal too many possible matches to allow an attacker to select the real password.

In an embodiment, the Huffman compression algorithm used may be one of a Huffman compression algorithm, a character-by-character Huffman compression algorithm, and a tree-based Huffman compression algorithm. In an example, the tables used for the Huffman compression algorithm may recite the probability that specific characters appear in passwords. In another embodiment, the compressed long password may be padded prior to encryption.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
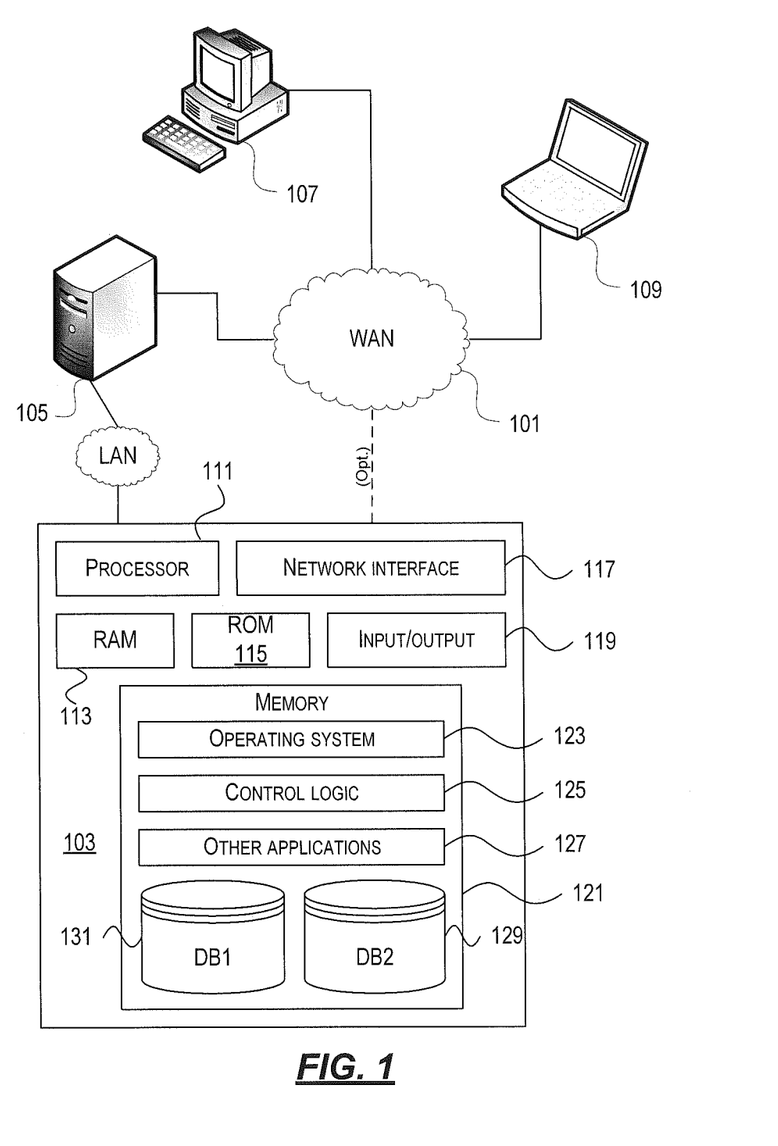
FIG. 1 depicts an illustrative computer system architecture that may be used in accordance with an embodiment.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Illustrative Embodiment(S)

In an embodiment, a mobile device, such as tablet or smartphone, may store personal information about a user of the mobile device. For example, identifying information about the user may be stored so that the user may interact with one or more separate services, such as a cloud service. This stored identifying information may comprise a password, username, or other sensitive information for the user. However, modern day systems often encrypt the stored information, for example, using a short secret, such as a PIN number.

Figure 2:
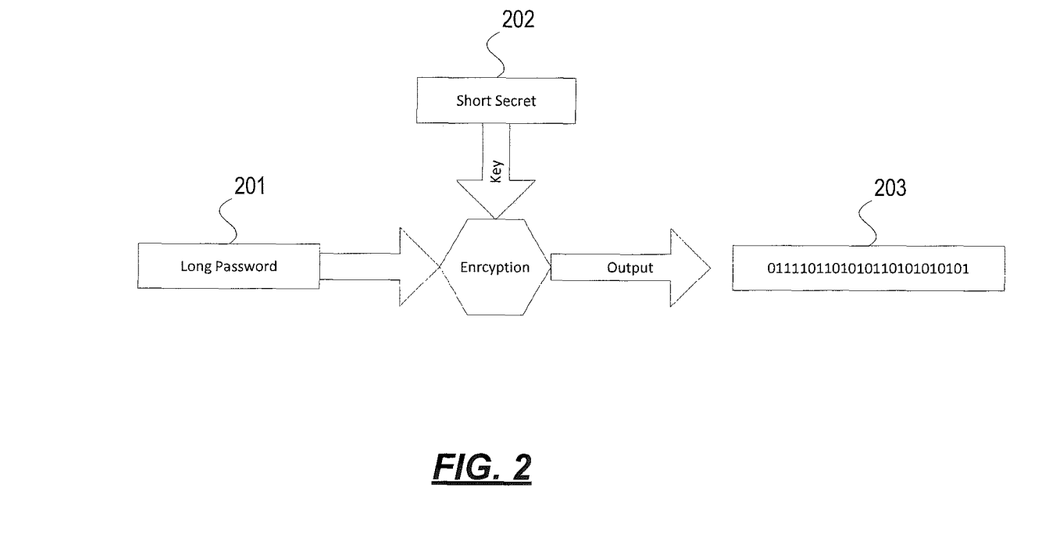
FIG. 2 depicts a block diagram of a system for encrypting a long password in accordance with an embodiment.
Figure 3:
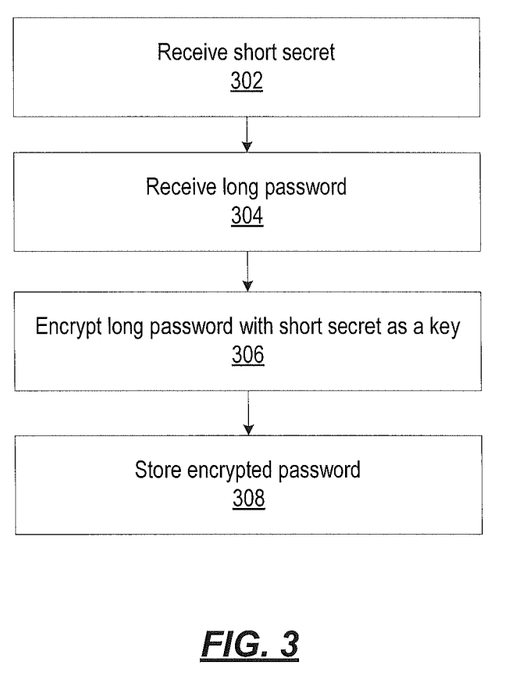
FIG. 3 is a flowchart of example method steps for encrypting a long password in accordance with an embodiment.

FIG. 2 illustrates a block diagram of a system for encrypting a long password and FIG. 3 illustrates a flowchart of example method steps for encrypting a long password. Any suitable computing device, such as device 107 and 109, may implement the method of FIG. 3.

The method of FIG. 3 may begin at step 302, where a short secret is received. For example, short secret 202 may be received. The short secret may comprise a PIN, e.g., a 4-8 digit number. This is only an example, and any suitable short secret may be implemented. The method of FIG. 3 may proceed from step 302 to step 304, where a long password is received. For example, long password 201 may be received. The long password may be the user's password to a separate service. In an embodiment, the long password may contain 8-12 alpha numeric characters and/or symbols. This is only an example and any suitable long password may be implemented.

The method of FIG. 3 may proceed from step 304 to step 306, where the long password is encrypted using the short secret as a key. The long password may be converted into a bit string for encryption. For example, the password maybe in ASCII or Unicode format and it may be converted into a bit string. In an embodiment, AES 128-bit encryption, or any other suitable encryption, may be used. In an example, padding bits may be added to the password so that the password is as suitable length for a corresponding encryption. The method of FIG. 3 may proceed from step 306 to step 308, where the encrypted password is stored. For example, encrypted password 203 may be stored.

The encrypted password may be decrypted in a similar fashion to FIG. 3. For example, the encrypted password may be decrypted using the short secret, and the decrypted bit string may be converted to a format corresponding to the password, such as ASCII or Unicode.

Figure 4:
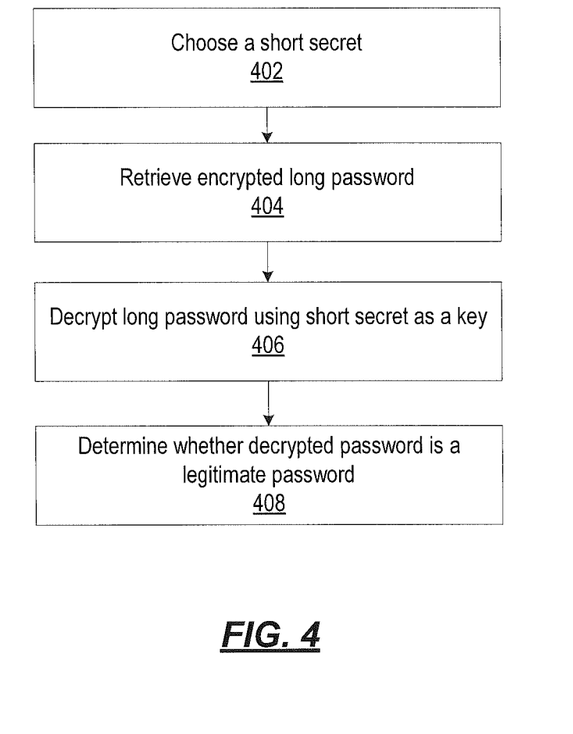
FIG. 4 is a flowchart of example method steps for cracking an encrypted password in accordance with an embodiment.

Accordingly, a mobile device may have an encrypted password stored on it, where a short secret is the key to the encryption. In an example, the mobile device may be stolen, and an unknown individual may attempt to decrypt the stored encrypted password. FIG. 4 illustrates a flowchart of example method steps for cracking an encrypted password. Any suitable computing device, such as device 107 and 109, may be used to implement the method of FIG. 4.

The method of FIG. 4 may begin at step 402, where a short secret is chosen. For example, a short secret may comprise a 4-digit PIN, and the short secret may be chosen at random. This is only an example, and any suitable short secret may be implemented. The method of FIG. 4 may proceed from step 404 to step 406, where an encrypted long password is retrieved. For example, the unknown individual may discover the stored encrypted password on the stolen mobile device. The method of FIG. 4 may proceed from step 404 to step 406, where the long password is decrypted using the chosen secret as a key. In an embodiment, AES 128-bit decryption, or any other suitable decryption, may be used The method of FIG. 4 may proceed from step 406 to step 408, where it is determined whether the decrypted password is a legitimate password. The unknown individual may use a number of tactics to determine whether the decrypted password is legitimate. For example, many passwords in a western system will use characters that range from ASCII 32 to ASCII 126. Accordingly, a decrypted password that includes an unused ASCII character is likely not a legitimate password. In another example, most passwords are typically 4 to 20 characters long. Any password outside this range is not likely to be a legitimate password. Many passwords contain English words. If the decrypted password contains an English word, it is likely a legitimate password. In another example, there are password dictionaries available that recite a number of known passwords. After combining each of these tactics, the unknown individual may be able to determine whether the decrypted password is a legitimate password.

The method of FIG. 4 may be repeated for every possible short secret, for example, for every passible 4-digit PIN. At the conclusion of this exercise, the unknown individual may have a short list of legitimate passwords, and may ultimately be able to determine the correct password based on, for example, trial-and-error.

Figure 5:
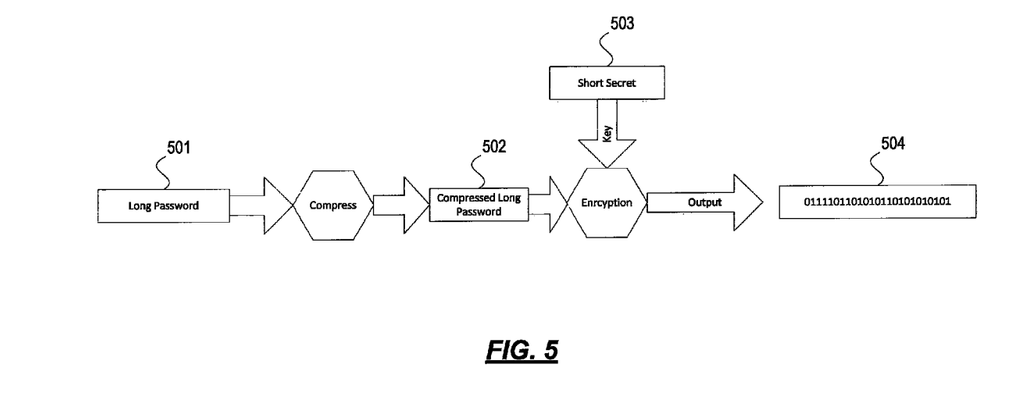
FIG. 5 depicts a block diagram of a system for compressing and encrypting a long password in accordance with an embodiment.

The password attack used by the unknown individual relies on the principle that a number of the decrypted passwords were determined not to be legitimate passwords. This may be corrected by adding a compression element to the encryption algorithm. FIG. 5 illustrates a block diagram of a system for compressing and encrypting a long password and FIG. 6 illustrates a flowchart of example method steps for compressing and encrypting a long password.

Figure 6:
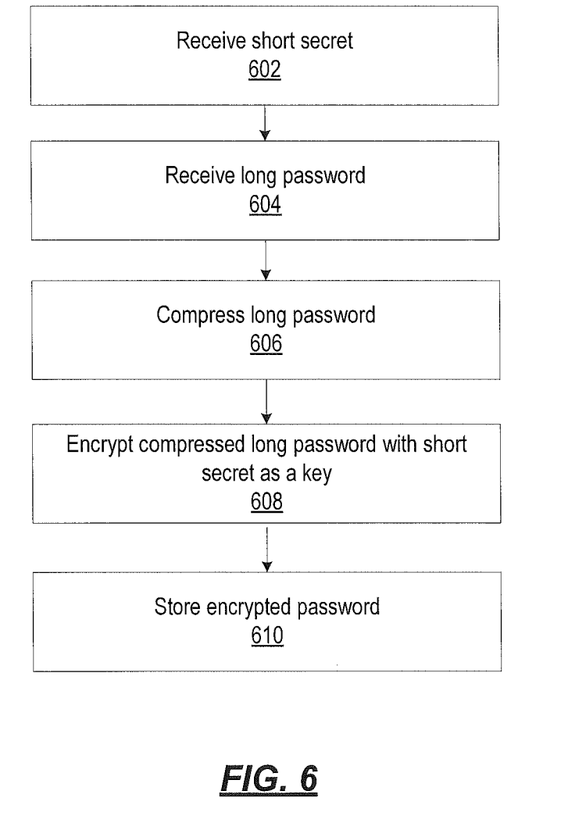
FIG. 6 is a flowchart of example method steps for compressing and encrypting a long password in accordance with an embodiment.

The method of FIG. 6 may begin at step 602, where a short secret is received. For example, short secret 503 may be received. The short secret may comprise a PIN, e.g., a 4-8 digit number. This is only an example, and any suitable short secret may be implemented. The method of FIG. 6 may proceed from step 602 to step 604, where a long password is received. For example, long password 501 may be received. The long password may be the user's password to a separate service. In an embodiment, the long password contains 8-12 alpha numeric characters or symbols. This is only an example and any suitable long password may be implemented.

The method of FIG. 6 may proceed from step 604 to step 606, where the long password is compressed. The long password may be converted into a bit string for compression. For example, the password maybe in ASCII or Unicode format and it may be converted into a bit string. In an embodiment, an entropy encoding algorithm or a compression algorithm may be implemented. For example, the long password may be processed such that its entropy is reduced. In an embodiment, the entropy encoding algorithm or compression algorithm may comprise a Huffman compression algorithm (also referred to as Huffman coding). Long password 501 may be compressed into compressed long password 502.

The method of FIG. 6 may proceed from step 606 to step 608, where the compressed long password is encrypted using the short secret as a key. In an embodiment, AES 128-bit encryption, or any other suitable encryption, may be used. In an example, because the password has been compressed, padding bits may be added to the password so that the password is a suitable length for a corresponding encryption. The method of FIG. 6 may proceed from step 608 to step 610, where the compressed and encrypted password is stored. For example, compressed and encrypted password 504 may be stored.

The compressed and encrypted password may be decrypted and decompressed in a similar fashion to FIG. 6. For example, the encrypted password may be decrypted using the short secret, and the decrypted bit string may be decompressed using any suitable algorithm. The decompressed bit string may then be converted to a format corresponding to the password, such as ASCII or Unicode.

Figure 7:
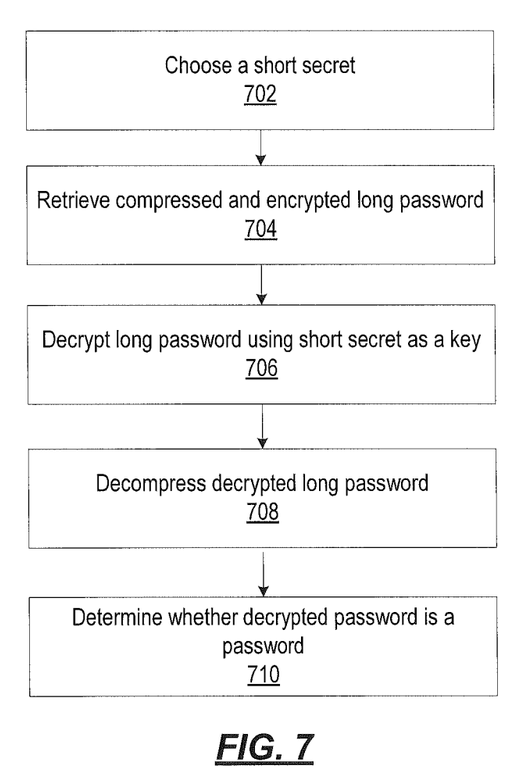
FIG. 7 is a flowchart of example method steps for cracking a compressed and encrypted password in accordance with an embodiment.

Accordingly, the mobile device may have a compressed and encrypted password stored on it, where a short secret is the key to the encryption. In this example, the mobile device may also be stolen, and an unknown individual may attempt to decrypt the compressed and encrypted password. FIG. 7 illustrates a flowchart of example method steps for cracking a compressed and encrypted password. Any suitable computing device, such as device 107 and 109, may be used to implement the method of FIG. 7.

The method of FIG. 7 may begin at step 702, where a short secret is chosen. For example, a short secret may comprise a 4-digit PIN, and the short secret may be chosen at random. This is only an example, and any suitable short secret may be implemented. The method of FIG. 7 may proceed from step 704 to step 706, where a compressed and encrypted long password is retrieved. For example, the unknown individual may discover the stored compressed and encrypted password on the stolen mobile device. The method of FIG. 7 may proceed from step 704 to step 706, where the long password is decrypted using the chosen secret as a key. In an embodiment, AES 128-bit decryption, or any other suitable decryption, may be used The method of FIG. 7 may proceed from step 706 to step 708, where the decrypted password is decompressed. For example, a Huffman decompression algorithm, or any other suitable algorithm, may be used. The method of FIG. 7 may proceed from step 706 to step 708, where it is determined whether the decrypted password is a legitimate password.

As opposed to the previous iteration, where compression was not used, here the unknown individual is less likely to be able to determine that the decrypted and decompressed password is not legitimate. This is because compression is designed to reduce redundancy. Because each bit of the compressed and encrypted password carries an importance, a much higher portion of the decompressed and decrypted password will appear to the unknown individual to be a legitimate password when compared to encrypted password storage without compression.

For example, a Huffman algorithm may use tables that link particular bit sequences to particular symbols. The Huffman tables may be based on probabilities for the occurrence of specific symbols in modern language or in passwords. Accordingly, after a randomly selected short key is used to decrypt the compressed and encrypted password, the decrypted password will be decompressed using, for example, Huffman tables. The Huffman tables will ensure that the decrypted bits of the long password are then decompressed into symbols from the Huffman tables. Since the Huffman tables include symbols that are used in modern day language or that are used in passwords, the bits will decompress into commonly used symbols. Accordingly, the decompressed symbols will appear to be a legitimate password.

In another example, consider an eight character ASCII encoded password that does not implement compression. ASCII includes 256 possible symbols, where roughly 70 of them may appear frequently in passwords, e.g., letters A-Z and a-z; numbers 0-9; punctuation. In a one character password, this would mean roughly 28% (or 70/256) of the decrypted bits would represent potential passwords, e.g., a one character password that comprises a character that appears frequently in passwords. However, in an eight character password, the probability that the decrypted bits would represent a potential password would drop to $0.28^8$ (28% for each of the eight characters), or 0.003%. Because of this, a brute force attack has a high probability of success against an encrypted eight character ASCII encoded password, where the encryption key is a short secret, In another example, when compression is implemented with the encrypted eight character ASCII encoded password, this brute force attack has a much lower probability of success. A compression algorithm may assign short bit streams to each of the ASCII encoded symbols that are often used in passwords, e.g., letters A-Z and a-z; numbers 0-9; punctuation. When considering the one character password, a decrypted password will comprise a random stream of bits, and the decompression algorithm will then match the decrypted stream of bits to one of the short bit streams assigned to the ASCII encoded symbols most often used in passwords. Because of this assignment, after decompression, the one character password will have a very high probability of appearing to be a potential password, e.g., near 100%. Accordingly, as the password grows from one character to eight characters, the probability that a randomly decrypted password, after decompression, would appear to be a potential password is still near 100%.

In an example, the probability described above, for a random decrypted password that is decompressed, is near 100% rather than at 100% because of the chance that a randomly decrypted password, e.g., random selection of bits, may include a partial character that is not properly decompressed. In an embodiment, during compression, for example, during step 606 in FIG. 6, a special character may be added to a password that denotes that end of a password. The special character may be compressed along with the rest of the password. Accordingly, after a password is decrypted and decompressed, the algorithm may determine the end of the password by the special character. In another embodiment, after the special character, a random number of random bits may be added to the password during compression. This may further confuse an attacker that is attempting to discard a potential password as not legitimate based on password length. In an embodiment, the length of the password may be encoded along with the password. For example, the length of the password may be encoded such that an algorithm can detect the start location for added random bits. Those familiar with the art of compression would readily understand other techniques for indicating the end of a compression sequence.

The method of FIG. 7 may be repeated for every possible short secret, for example, for every possible 4-digit PIN. At the conclusion of this exercise, the unknown individual is likely left with a long list of legitimate passwords, and it may be difficult to determine the correct password.

In an embodiment, the compression algorithm used in the method of FIG. 9 is a Huffman compression algorithm. For example, a Huffman algorithm may use tables to determine the probability that specific symbols, such as "a," are used in language. In an embodiment, Huffman tables may be created specifically for passwords, such that the tables determine the probability that specific symbols, such as "a," are used in a password.

Below is an example of a Huffman table calculated based on character usage in the play Romeo and Juliet:

| Huffman Table |
| --- |
| A: 7% 0010 |
| B: 1% 011000 |
| C: 2% 000101 |
| D: 3% 00011 |
| E: 12% 101 |
| F: 1% 001100 |
| G: 1% 001101 |
| H: 6% 0101 |
| I: 6% 0100 |
| J: 0% 011001100 |
| K: 0% 0110010 |
| L: 4% 1101 |
| M: 3% 01101 |
| N: 6% 1001 |
| O: 8% 0000 |
| P: 1% 110000 |
| Q: 0% 0110011101 |
| R: 6% 1000 |
| S: 6% 0111 |
| T: 9% 111 |
| U: 3% 00111 |
| V: 1% 110001 |
| W: 2% 000100 |
| X: 0% 0110011011 |
| Y: 2% 11001 |
| Z: 0% 01100111001 |

In an embodiment, the Huffman compression may use a single table for every character in a password. For example, the character "a" will be encoded the same way in a password no matter where it appears. In another embodiment, a different Huffman table may be calculated for each character of the password. For example, a first table may calculate the probabilities for a first character in a password, and may assign bit streams to characters based on the calculated probabilities for the first character, and a second table may calculate the probabilities for a second character in a password, and may assign bit streams to characters based on the calculated probabilities for the second character. In this example, the character "a" may be encoded differently based on its location in a password.

In another embodiment, the different tables used for each character may be based on the preceding text. For example, the probabilities for a second character may depend on the probabilities for a first character, e.g., how likely is it that a second symbol is an "e" given that the first symbol is an "a." Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

The invention claimed is:

1. A method comprising:
receiving, by a computing device, a short secret and a long password;
compressing, by the computing device, the long password;
encrypting, by the computing device, the compressed long password using an encryption key comprising the short secret; and
storing, by the computing device, the compressed and encrypted long password in a memory of the computing device.

2. A method according to claim 1, wherein the long password is compressed using an entropy encoding algorithm, the entropy encoding algorithm comprising a Huffman compression algorithm such that a different Huffman table is used for each character in the long password.

3. A method according to claim 2, wherein tables used to accomplish the Huffman compression algorithm recite a probability that specific characters appear in passwords.

4. A method according to claim 1, further comprising converting the long password into a bit string, and wherein compressing the long password comprises compressing the bit string of the long password.

5. A method according to claim 1, further comprising padding the compressed long password prior to encrypting the compressed long password.

6. A method according to claim 1, wherein the compressed and encrypted long password is stored such that a password attack that uses every possible short key to decrypt a plurality of passwords would fail to disqualify a majority of the decrypted passwords as not legitimate based on a set of rules describing legitimate passwords.

7. A method according to claim 1, wherein, when a random short key is used to decrypt the compressed and encrypted long password, the decrypted long password appears to be a legitimate password based on a set of rules describing legitimate passwords.

8. A method according to claim 1, wherein the short secret comprises a PIN number and the long password is formatted according to one of ASCII and Unicode.

9. A computing device, comprising:
a processor, and
a memory storing instructions that, when executed by the processor, configure the computing device to perform:
receiving a short secret and a long password;
compressing the long password;
encrypting the compressed long password using an encryption key comprising the short secret; and
storing the compressed and encrypted long password in the memory.

10. A computing device according to claim 9, wherein the long password is compressed using an entropy encoding algorithm, the entropy encoding algorithm comprising a Huffman compression algorithm such that a different Huffman table is used for each character in the long password.

11. A computing device according to claim 10, wherein tables used to accomplish the Huffman compression algorithm recite a probability that specific characters appear in passwords.

12. A computing device according to claim 9, wherein the memory further stores instructions that, when executed by the processor, configure the computing device to perform: converting the long password into a bit string, and wherein compressing the long password comprises compressing the bit string of the long password.

13. A computing device according to claim 9, wherein the memory further stores instructions that, when executed by the processor, configure the computing device to perform: padding the compressed long password prior to encrypting the compressed password.

14. A computing device according to claim 9, wherein the compressed and encrypted long password is stored such that a password attack that uses every possible short key to decrypt a plurality of passwords would fail to disqualify a portion of the decrypted passwords as not legitimate based on a set of rules describing legitimate passwords.

15. A computing device according to claim 9, wherein, when a random short key is used to decrypt the compressed and encrypted long password, the decrypted long password appears to be a legitimate password based on a set of rules describing legitimate passwords.

16. A computing device according to claim 9, wherein the short secret comprises a PIN number and the long password is formatted according to one of ASCII and Unicode.

17. One or more non-transitory computer-readable storage media storing computer-executable instructions that, when executed by one or more processors of a data processing system, cause the system to perform:
receiving a short secret and a long password;
compressing the long password;
encrypting the compressed long password using an encryption key comprising the short secret; and
storing the compressed and encrypted long password in a memory of the data processing system.

18. A non-transitory computer-readable medium according to claim 17, wherein the long password is compressed using an entropy encoding algorithm, the entropy encoding algorithm comprising a Huffman compression algorithm such that a different Huffman table is used for each character in the long password.

19. A non-transitory computer-readable medium according to claim 18, wherein tables used to accomplish the Huffman compression algorithm recite a probability that specific characters appear in passwords.

20. A non-transitory computer-readable medium according to claim 17, wherein the media further stores computer-executable instructions that, when executed by one or more processors of a data processing system, cause the system to perform: converting the long password into a bit string, and wherein compressing the long password comprises compressing the bit string of the long password.

* * * * *